FIG. I.

INVENTORS
DONALD ARTHUR KENT
PETER LESTER CROWCROFT
By
ATTORNEYS

United States Patent Office

3,534,590
Patented Oct. 20, 1970

3,534,590
ULTRASONIC TESTING APPARATUS
AND METHOD
Donald Arthur Kent, Redditch, and Peter Lester Crowcroft, Fernhill Heath, England, assignors to Imperial Metal Industries (Kynoch) Limited, Witton, Birmingham, England, a corporation of Great Britain
Filed Sept. 20, 1967, Ser. No. 669,056
Claims priority, application Great Britain, Oct. 6, 1966, 44,710/66
Int. Cl. G01n 29/04
U.S. Cl. 73—67.5
11 Claims

ABSTRACT OF THE DISCLOSURE

A testing method and apparatus in which radiation indicative of the quality at each location on the test subject of the property being tested is received, is recorded with location signals identifying the locations, and is eventually utilised to produce a pictorial representation of the test object in which the quality of the tested property at each of the locations is shown at corresponding positions.

BACKGROUND OF THE INVENTION

This invention relates to testing apparatus and methods of testing, and is particularly concerned with the analysis of test data. The invention is especially, but not exclusively, relevant to the ultrasonic examination of case-bonded solid propellant rocket motors.

The ultrasonic examination of solid propellant rocket motors has been previously proposed, but the methods of carrying it into effect have been unsatisfactory, particularly as regards analysis of the data obtained by the ultrasonic inspection. In particular it has been found that, for complete accuracy without discarding some important data, highly trained personnel are necessary for interpreting the results of the inspection, and interpretation has taken a considerable period of time for each motor.

Thus it is an object of the invention to provide an accurate testing apparatus and method of testing which is applicable to the testing of both solid propellant rocket motors and other objects, in which interpretation is obtainable readily and by comparatively lay personnel.

SUMMARY OF THE INVENTION

In accordance with the invention a method of testing a test object comprises sequentially receiving from a plurality of locations on the test object radiation indicative of the quality at each location of the property being tested, recording on a storage tape a plurality of qualitative signals corresponding to the radiation received, recording on the storage tape location signals each identifying a corresponding one of the locations and each arranged in a predetermined relationship on the tape with the qualitative signal related with that location, and utilising the qualitative and location signals to produce a pictorial representation of the test object in which the quality of the tested property at each of the locations is shown at a position corresponding to the position on the test object itself of the corresponding location.

Preferably, the test object is systematically scanned with at least one probe beam of radiation, and the radiation received from each of the plurality of locations on the test object is transmitted from the probe beam through a portion at least of the test object at that location, and may also be reflected from the test object at that location, before being so received.

Preferably also the radiation is ultrasound, and the amplitude of the received radiation, which is attenuated compared with the amplitude of the radiation of the probe beam, is indicative of the quality at each location of the property being tested. As a less preferably alternative other radiation to which the test object is not opaque may be utilised, such as X-radiation, radioactive emission, and high energy atomic particles as examples.

Preferably further the amplitude of the received radiation is converted by a receiver probe to a voltage analogue, and after amplification this is operated upon by a logarithmic transfer stage to produce an output which is the voltage analogue of the logarithm of the input to the logarithmic transfer stage, whereby the qualitative signals recorded on the storage tape are in logarithmic relationship to the amplitude of the received radiation.

In accordance with the invention also, apparatus for testing a property of a test object comprises a radiation emitter, a radiation receiver for sequentially receiving radiation from the emitter which has been transmitted through a portion at least of the test object at a plurality of locations thereon, the received radiation being indicative of the quality at each location of said property, a storage tape for recording a plurality of qualitative signals corresponding to the radiation received by the receiver and for recording location signals each identifying a corresponding one of the locations and each arranged in a predeterminer relationship on the tape with the qualitative signal related with that location, and analysing means for utilising the qualitative and location signals to produce a pictorial representation of the test object in which the quality of the tested property at each of the locations is shown at a position corresponding to the position on the test object itself of the corresponding location.

Briefly outlined, in a typical example of the invention, a case-bonded solid propellant rocket motor which comprises a steel case, an interior rubber liner and cast in situ solid propellant which should all be bonded together, is ultrasonically examined in a large scale water-immersion ultrasonic scanning machine which is numeriacally controlled to a pre-set programme appropriate to the rocket motor undergoing examination. Two ultrasonic tests are applied simultaneously; (a) a radial transmission test capable of detecting steel/liner unbonds, liner/propellant unbonds and propellant porosity; and (b) a pulse-echo test in which the resulting degree of reverberation within the steel case wall is indicative of steel/liner bond or unbond.

The bases of the two ultrasonic techniques employed are widely known so that a full description is not necessary in this specification. Both techniques employ a pulsed acoustic transmission and necessitate the measurement and recording of signal amplitudes at a receiver.

During a typical test sequence the whole volume and surface to be tested is subjected to these two tests and the total acoustic data in terms of received amplitudes is recorded on magnetic tape together with position coordinates for every 1/10 sq. in. of inspected surface.

Each test, therefore, provides a permanent acoustic image of the rocket motor on magnetic tape so as to retain the total acoustic information and to allow complete flexibility in subsequent off-line processing of the acoustic data, which can, therefore, be optimised for each motor.

The output after processing is a family of facsimile plots in which known features and defects are clearly visible to lay observers, both in terms of defeat position and acoustic degree. Each facsimile plot is a "to scale" representation of the motor in surface development form in which only one selected acoustic range is displayed. A family of such plots may display as many ranges from the total acoustic range as may be required and allows abnormalities to be displayed in direct relationship to the large sectional changes encountered in many rocket motor designs.

BRIEF DESCRIPTION OF THE DRAWINGS

To describe the typical example in greater detail, reference will now be made to the accompanying drawings, in which.

DESCRIPTION OF THE PREFERRED EMBODIMENTS

Figure 1:
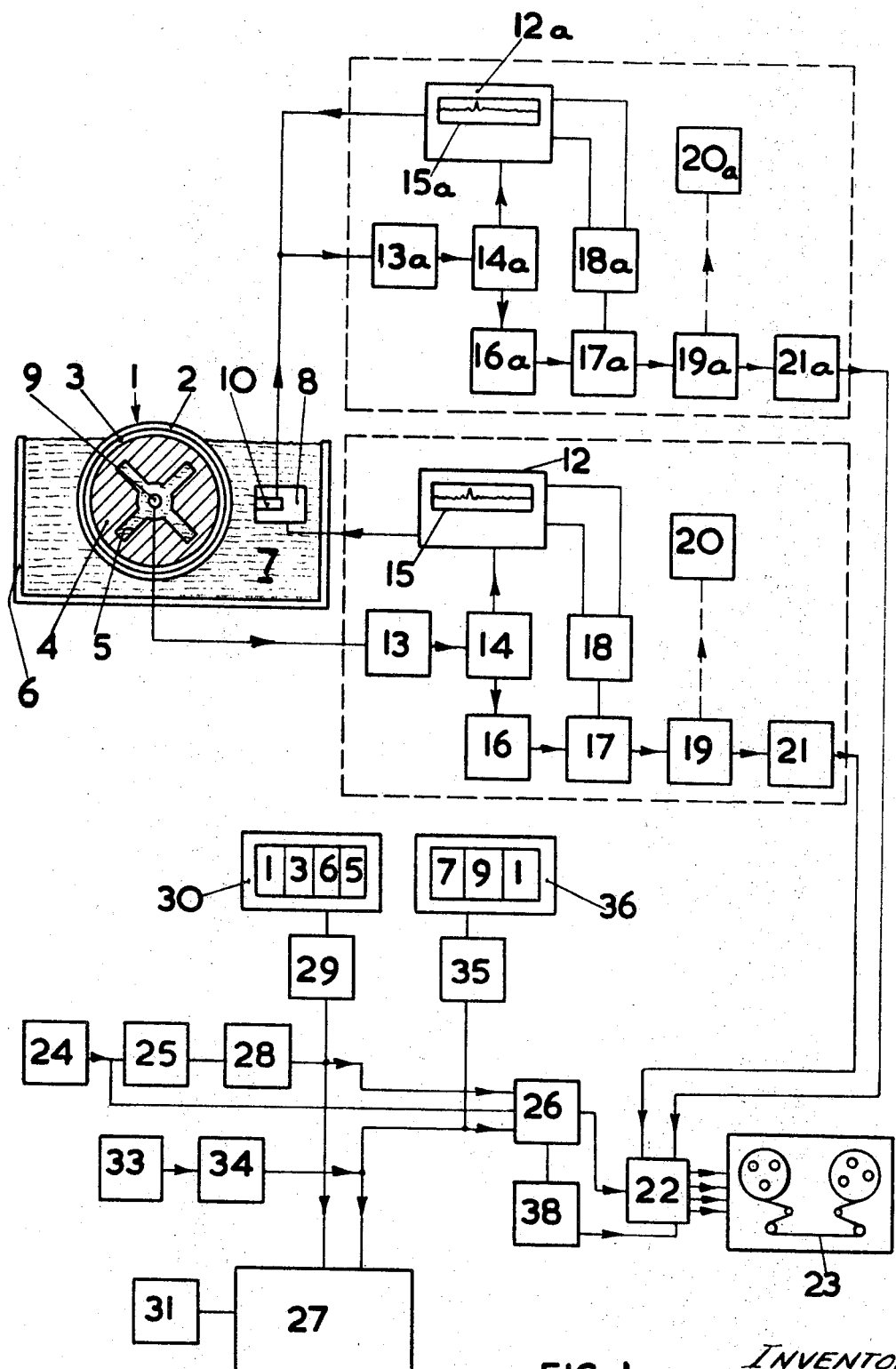
FIG. 1 is a schematic diagram of the data acquisition apparatus.

Referring initially to FIG. 1, a rocket motor 1 is shown in cross-section and comprises a steel case 2, a rubber liner 3 bonded to the case 2, and solid propellant 4 cast in situ within and thereby bonded to the liner 3. As is clearly shown, radial recesses 5 in the propellant 4 produce pronounced changes in its radial thickness progressing circumferentially around the motor 1, whereas designed changes in the propellant cross-section itself (not shown) longitudinally of the motor 1 also affect the radial propellant thickness. The liner 3 and case 2 are of greater uniformity, but also contain predetermined inhomogeneities, for example, in the form of longitudinal and peripheral welds in the case 2.

Each rocket motor 1 to be examined is mounted between centres in a large imersion tank 6 filled with water 7, and the whole required motor volume inspected sequentially by alternate linear scanning of probe assemblies 8, 9, 10 and incremental rotation of the motor 1 between its centres. The probe assemblies comprise a transmitter probe 8 for transmission testing, a receiver probe 9 for the transmission testing and a transmitter/receiver probe 10 for reflection testing. Digital encoders (to be described) provide data on probe linear position and motor rotary position at all times. This data forms the basis of recorded spatial addresses and also allows the scanning probe motion to be programmed and controlled by a numerical computer (as described below).

Concentrating firstly on the ultrasonic aspect of the apparatus shown in FIG. 1, and on the transmission testing, the ultrasonic unit 12 includes a pulse generator which produces high energy pulses of brief duration which are converted to acoustic waves by the Piezo electric crystal of the transmitting probe 8. The pulse repetition rate lies between 100–500 p.p.s. in accordance with pre-setting, and is constant for a given setting. The frequency of each resulting acoustic wave train is determined by the transmitting crystal and is typically 500 kc./s. for the radial transmission test.

The acoustic path consists of the water 7 as a coupling medium, together with that section of rocket motor 1 currently between the probes 8 and 9.

The acoustic beam is parallel in water to a distance of 13.5 c.m. from the transmitter (Fresnel Zone) thereafter diverging with a half angle of 6°. The energy reaching the receiver probe 9 varies according to the variation in any losses occurring during transit; these losses stem from absorption, refraction, destructive interference and reflective scatter in the acoustic path.

The receiver crystal of the probe 9 produces a voltage analogue of each received wave train. The analogue is amplified +35 db or +70 db by a pre-amplifier 13, according to the needs of the test, and after further amplification at 14 is displayed on the ultrasonic unit oscilloscope 15 against a synchronous time base in the usual manner. In addition, the amplified output passes to a logarithmic transfer stage 16, the output of which is the voltage analogue of the logarithm of the input, i.e. output amplitude is proportional to the logarithm of input amplitude. This has the effect of compressing the measurement scale of the test thereby allowing a much greater signal variation to be accommodated within the dynamic range of the total recording equipment. Since it is also customary to state signal level comparisons in terms of a decibel scale, linear increments in the logarithmic analogue relate directly to decibel increments of actual signal; this allows simplification in later data processing.

The signal thus far in the sequence contains all the received components, namely: those which have traversed the acoustic path by the most direct route, plus others which have taken less direct paths. The signal is now gated at 17 connected to the unit 12 through a gating control 18 to exclude all but the five or six cycles which have taken the most direct route. The peak amplitude of this group is the measurement to be recorded.

The gated signal is connected to a true peak detector 19 whose output is a quasi-D.C. signal proportional to the amplitude of the largest half-cycle in the gated group, irrespective of the number of half-cycles in the group. This output may be directly connected to an on-line pen recorder 20 if required; pen deflection is then proportional to the logarithm of received amplitude. The difficulty in extracting useful information from pen records with rocket motors having complex variations, however, means that this facility is rarely used.

The peak detector output also passes to a voltage/frequency converter 21, the output of which is a train of constant width pulses. The pulse repetition rate is proportional to the D.C. level of the input signal. This output, therefore, is a frequency, proportional to the logarithm of the received amplitude. Typical relations are, 100 pulses per second change for 1 db change in signal with a 30 db range producing a maximum range of 300 to 3,300 p.p.s.

This pulse train may be displayed as a frequency-metre count on-line (not shown) as an aid to setting up, and passes through a tape amplifiers and bias units arrangement 22 to be continuously recorded on one channel of the tape 23 during linear traverse, and forms a permanent record of the test.

For reflection testing, the transmitter/receiver probe 10 is utilised together with a parallel set of equipment to that described for transmission testing. Thus the same reference numerals are used with suffix a. Consequently, only a brief description is necessary—an ultrasonic unit 12a is connected to the probe 10 to produce ultrasonic pulses therefrom. The reflected signal produces a voltage analogue in the probe 10 which is dependent in magnitude upon the amplitude of the reflected signal, and this passes to the pre-amplifier 13a, and thence through further amplification at 14a to the oscilloscope 15a. The pre-amplifier output also passes to a logarithmic transfer stage 16a, is gated at 17a by means of a gating control 18a to select a section of the signal having an amplitude related to the reverberation time of the acoustic waves in the case 2, and passes through a true peak detector 19a. The pen-recorder 20a is provided for use if required. A further voltage/frequency converter 21a then passes a train of pulses to the arrangement 22 for recording on a further channel of the tape 23, the pulse repetition rate being proportional to the logarithm of the amplitude of the selected section of the acoustic signal received by the probe 10 after reflection by the motor 1.

Concentrating now on the scanning aspect of the apparatus shown in FIG. 1, linear motion of the probes 8–10 for each scan is produced by the rotation of a lead screw (not shown). Rotation of the motor 1 is produced by rotation of a headstock (not shown) forming one of the centres for motor 1.

The scanning programmes are so arranged that these functions occur alternately such that a typical sequence becomes:

Linear motion forwards for full length of motor; linear motion ceases; motor rotates a programmed increment;

linear motion in reverse for full length of motor; followed by a further rotation increment, etc.

In this way, the whole motor volume is covered in a series of parallel scans.

When linear motion is in progress, either forward or reverse, a complete address of linear position, together with rotary position, is formulated and recorded for each 1/10 inch of linear traverse to provide locational information for the recorded acoustic information. No recording is made while a rotation increment is in progress.

Regarding linear motion, the lead screw rotates at 90 r.p.m. and has a 2-inch pitch resulting in a linear scanning rate of 3 inches per second. A photoelectric revolution counter 24 coupled to the lead screw generates 20 pulses per revolution, i.e. 1 plus per 1/10 inch linear traverse. These pulses are used to drive a reversible electronic register 25 such that the count accumulated in the register 25 at any instant is the linear position of the probes 9, 8, 10 accurate to ±1/20 inch relative to an arbitrary zero on the apparatus.

The counter output is four decades of a 5-bit unweighted binary decimal code which has advantages over other codes when a reversible register is required by virtue of its symmetrical form. In addition to driving the register each revolution counter pulse is connected to an address serialiser 26 to initiate the formation of a complete recorded address every 1/10 inch of traverse.

A computer 27 controlling the scanning programme through the lead screw and headstock motors 31 utilises 1242 binary coded decimal (BCD) for sequence control; the output of the register 25, therefore, undergoes a code change at 28 to 1242 BCD in order to feed continuous information of linear position into the computer 27. The same information, in 1242 BCD code, is presented to the address serialiser 26 for recording.

During setting up and calibration procedure, it is necessary for the operator to know accurately the position of the probes 8, 9, 10; the 1242 BCD code of linear position is, therefore, further converted at 29 to pure decimal and displayed on the contral console as a four decade number, i.e. 136.5 inches, as shown at 30.

The reversible register 25 and all stages of code change give outputs of all bits in parallel so that no time delay is involved in transfer of data from stage to stage.

Regarding rotary motion, a photoelectric shaft position encoder 33 attached to the headstock indicates at all times the position of the headstock ±1/1000 of a revolution. The position is relative to an arbitrary zero which is nevertheless related to each motor 1 by virtue of the mounting arrangements of motor to headstock centre. The encoder output comprises three decades of 4-bit unweighted Watts Reflected Decimal Code. This is a known cyclic code giving advantages over other codes where a multi-decade output of rotation is required by virtue of the change of only one bit at a time. To suit the control computer 27, this output is converted at 34 to 1242 BCD code and also passes in this form to the address serialiser 26. In addition, it is further converted at 35 to a three decade pure decimal display to meet the requirements of the plant operator, i.e. console display 791=791/1000 revs. from zero position. This is shown at 36.

It will be noted that a complete inspection sequence only involves one complete revolution of the rocket motor under examination.

The above described processes for linear and rotary motion make available at the address serialiser three separate sets of data.

(1) A pulse every 1/10 inch of traverse.
(2) A complete address of linear position, up dated every 1/10 inch of traverse.
(3) A complete address of rotary position, constant during linear traverse.

The linear position address consists of four decades of 1242 BCD code=16 bits.

The rotary position address consists of three decades of 1242 BCD code=12 bits.

A total address containing both co-ordinates, therefore, comprises seven decades of four bits each, a total of 28 bits in 1242 BCD code. These are all available simultaneously at the serialiser inputs.

Seven recording channels of the magnetic tape 23 are made available for recording the complete address, 1 channel per decade. The function of the serialiser 26 is to operate on the seven input decades simultaneously, reading off the 4 digits in each decade and presenting these serially to the appropriate recording channel. This is accomplished by scanning the 28 input bits in the appropriate sequence and routing them to the appropriate tape channel. This sequence is initiated every 1/10 inch traverse by the single pulses from the revolution counter 24.

The scanning circuitry in the serialiser 26 is driven by a 1 kc./s. clock 38, and produces bits of 1 millisecond duration with a 2 millisecond interval between bits. Since the seven decades are scanned simultaneously, the time taken to read and record the total address is 10 milliseconds.

In addition, the serialiser 26 utilises an eighth recording channel on which to record a register pulses synchronous with each digit read in; each complete address is, therefore, accompanied by four register pulses.

This sequence is repeated every 1/10 inch of linear traverse, i.e. once every 33.3 milliseconds in real time.

The sixteen channel magnetic tape running at 3¾ i.p.s. records each successive address simultaneously with recordings of ultrasonic amplitude related to that point on the motor surface to which the address refers. Recording is made only during linear traverse, not during incremental rotation.

The 1 kc./s. clock 38 is also connected directly to one channel of magnetic tape and continuously recorded during linear traverse. This provides a real-time reference against against which the recorded frequencies representing ultrasonic level are later compared.

Figure 3:
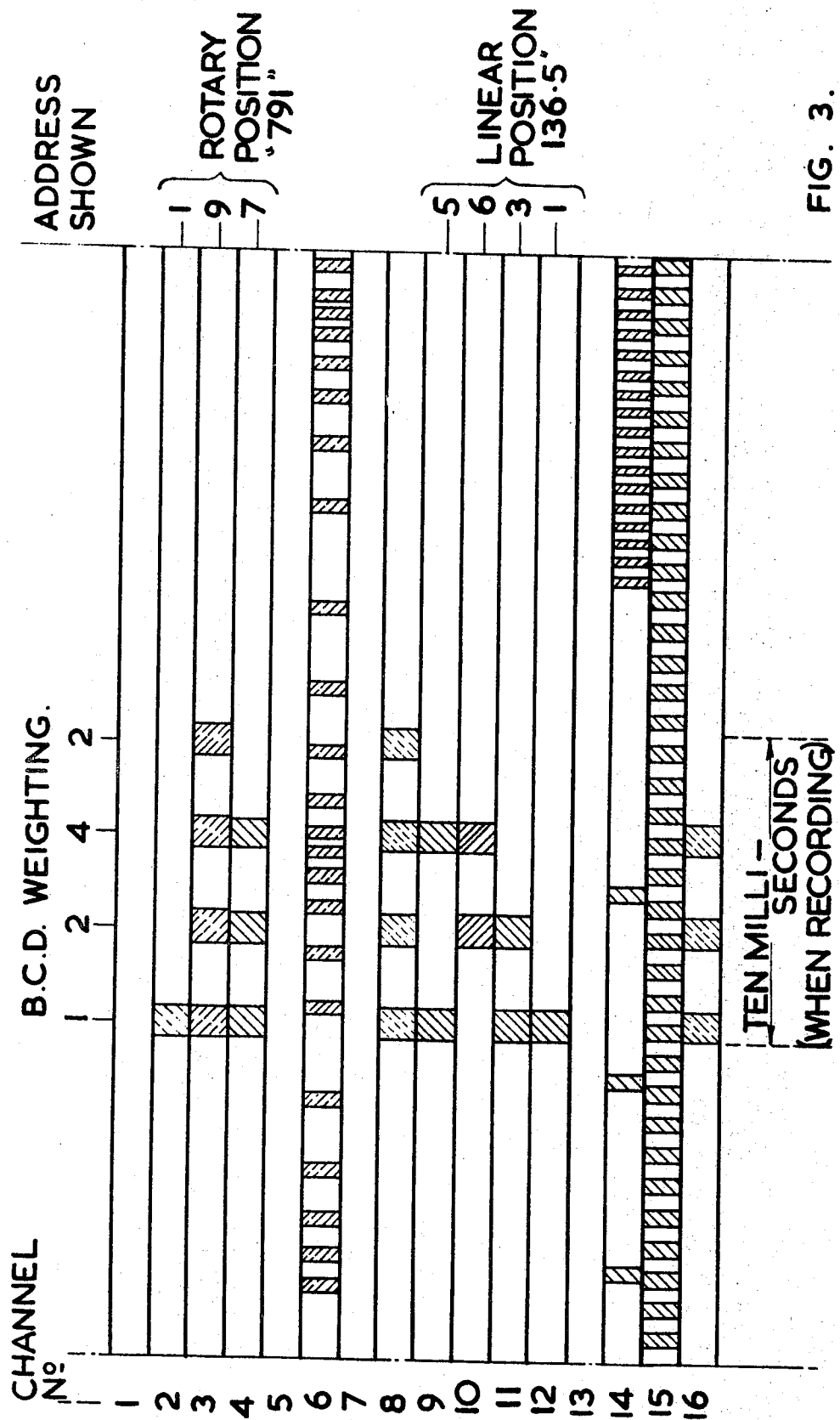
FIG. 3 is a schematic representation of a set of the recordings on a magnetic tape.

Referring now to FIG. 3, this shows in diagrammatic form, the recordings on one section of the magnetic tape. The tape, as mentioned above, has sixteen channels used as follows:

No. 1—Used for voice recordings, such as comments by the operator.
No. 2—Records units of the rotary position address.
No. 3—Records tens of the rotary position address.
No. 4—Records hundreds of the rotary position address.
No. 5—Spare.
No. 6—Records the pulse train of which the frequency is in logarithmic relationship with the amplitude of the transmitted ultrasonic wave.
No. 7—Spare.
No. 8—Records register pulses, one for each bit of the address information.
No. 9—Records tenths of the linear position address.
No. 10—Records units of the linear position address.
No. 11—Records tens of the linear position address.
No. 12—Records hundreds of the linear position address.
No. 13—Spare.
No. 14—Records a pulse train as No. 6, but for the reflected ultrasonic wave.
No. 15—Records the pulses from the 1 kc./s. clock.
No. 16—Column Parity. Records pulses if there is an odd number of recordings in each column of the addresses taken together.

The four columns of the addresses information are shown clearly in the drawing, together with a note of the binary coded decimal weighting for each column. Thus, as exemplified in FIG. 3, channel No. 2 carries a recorded pulse in the column weighted "1" to equal one unit; channel No. 3 carries recorded pulses in every column so as to equal 1+2+4+2 times 10—this equals 90; channel No. 4 carries recorded pulses in columns weighted 1, 2 and 4, and, therefore, =700. Hence, the rotary address 791 is recorded, and this represents, as mentioned above, an angular position at 0.791 of a revolution from a predetermined starting point.

As far as the linear address is concerned, channels Nos. 9, 10, 11 and 12 contribute 0.5, 6, 30 and 100 respectively to denote a linear position 136.5 inches from another predetermined zero.

The combination of the address for every 1/10 inch traverse, together with a typical programme rotation increment of 1 inch, measured on motor circumference, allows the magnetic recording to be visualised as a series of discrete acoustic measurements each relating to 1/10 sq. in. of motor surface and each labelled with its position on the motor.

The inspection of a typical motor some 10 feet in length and 10 inches in diameter involves 33 linear scans, the record containing some 40,000 such discrete measurements. This particular record is acquired in 28 minutes of inspection plant time which includes setting up and calibration, and occupies some 400 feet of 1 inch width magnetic tape. The recordings of four such motors may be made on 1800 foot tape spools conveniently used. The ultrasonic beam width of 1½ inches, together with divergence, degrades the resolution of defects to the order ½ sq. in. compared to 1/10 sq. in. resolution inherent in the address recording. This resolution is considered adequate for the inspection requirements in this example, but can obviously be improved for example by taking a greater number of scans and narrowing the ultrasonic beam.

Figure 2:
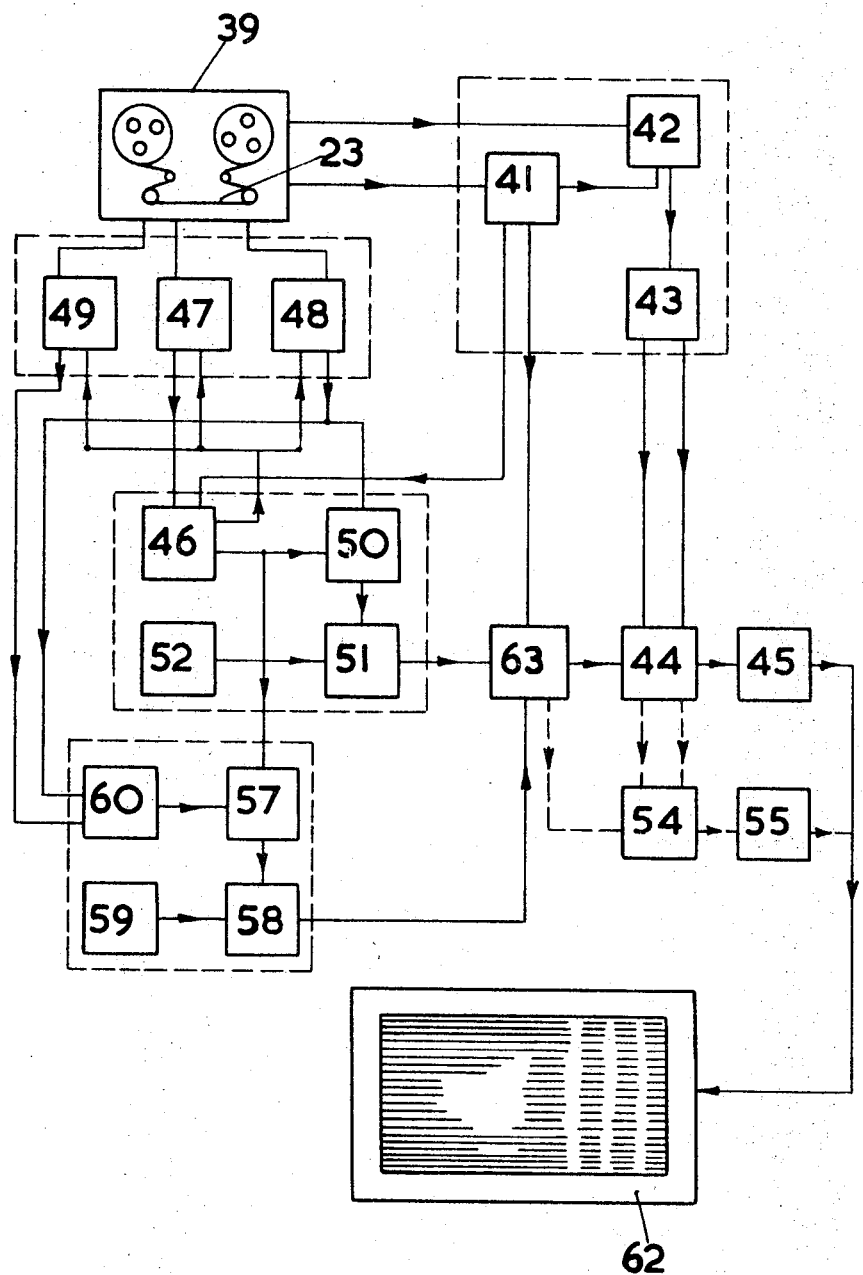
FIG. 2 is a schematic diagram of the data processing apparatus.

The magnetic tape record of the rocket motor inspection is removed from the recording plant and processed off-line on a separate set of equipment. The recording plant is, therefore, left free to acquire inspection data from further motors. A schematic outline of the processing equipment is shown in FIG. 2 to which reference is now made.

Recorded data is played back from a 16 channel tape deck 39 with the tape speed during re-play typically eight times the speed of recording, i.e. 30 i.p.s. A plot from an inspection time of 24 minutes is, therefore, produced in 3 minutes. In a production programme this provides ample time to fully process one inspection while data from another motor is being acquired.

As the tape is replayed, addresses are read out successively from the seven tape channels Nos. 2–4 and 9–12, together with and controlled by the four register pulses of channel No. 8 accompanying each address. The register pulses arrive in sequence at the read-in sequence control 41 and programme this unit so as to route the accompanying address digits to appropriate memory elements in an electronic register 42. This register 42, termed the address store 42, has a 28-bit capacity equal to the number of bits in one complete address and utilises a transistorised bi-stable circuit for each memory element.

After four register pulses have passed the tape read-off head, the address store 42 contains the complete address which accompanied those four register pulses. By giving appropriate weighting to each memory element, the store contains the complete spatial address in 1242 BCD code, e.g. the exemplified address-rotary position 791, linear position 136.5 inches.

The time taken for this read-in operation of each address is dependent upon tape speed. At 30 i.p.s. each bit is read off as a 125 microseconds pulse, the complete address being stored in 1.25 milliseconds. At this tape speed, successive complete addresses are read in, one every 4.2 milliseconds.

The two co-ordinates comprising this address are simultaneously converted, each to a voltage vector proportional to the decimal value of the co-ordinate, i.e. 791 and 136.5 in the example, in a digital-to-analogue converter 43. This digital to analogue conversion is by conventional means, the 28 bits comprising the stored address being connected in parallel to weighted summing circuits.

The two address vectors are applied to the deflection circuits of the oscilloscope plotter 44, the rotary co-ordinate to vertical deflection and linear co-ordinate to horizontal deflection. The oscilloscope beam is, therefore, deflected to a position on its screen representing the stored address. During address read-in and deflection, the beam is initially extinguished.

When the plotter beam is positioned, beam "bright up" is applied according to the findings of the ultrasonic signal level analyser to be described, and the point is plotted and recorded by a Polaroid camera 45. Immediately following the plotting operation the address store 42 is cleared ready to receive the next address.

The photographed plot of the complete tape recording is, therefore, built up, point by point, at a rate of approximately 240 points/second into a rectangular area, which represents a pictorial representation or facsimile of the motor cylinder in surface development form. The physical size of the plot is approximately 3 inches x 1 inch for the 10 inches diameter 10 feet long motor examplified, and is adequate for resolution of defects having a real size of ½ inch x ½ inch.

Concurrently with the decoding of spatial addresses, ultrasonic signal processing takes place and consists of a signal level assessment according to a pre-set programme and results in an output to the plotter concurrent with each discrete address contained in the record. The following description refers specifically to the processing of transmission test data; processing of reflection test data differs only in minor detail.

During the time taken to decode each spatial address, there is measured the recorded frequency representing the logarithm of ultrasonic signal which was recorded concurrent with each address. The measured frequency is expressed as decibel level of signal and compared with a pre-set level selected by a processing programme. This results in an instruction to print white or black at the appropriate address point in the plot, depending whether the comparison shows the recorded level to be greater or less than the pre-set level.

The frequency count and conversion to decibel level is made as follows:

The read-in control actuates an interval counter 46 which opens gates 47–49 whereby pulses from the recorded clock channel No. 15 are passed via the gate 47 into the interval counter 46. Simultaneously, pulses from the recording of ultrasonic level are passed via the second gate 48 to a level counter 50. After ten clock pulses have passed into the interval counter 46, this causes both gates 47 and 48 (also 49) to close inhibiting any further pulses. The count accumulated in the level counter 50 is thus a measure of the recorded frequency, i.e. in terms of the real time of the inspection, N pulses in a 10 millisecond interval.

The level counter 50 has the additional function of expressing the accumulated count as a decibel level of signal as follows:

Prior to the recording of the inspection, a calibration sequence adjusts the voltage/frequency conversion such that the minimum threshold signal of the monitoring equipment produces a frequency of 300 cycles per second; larger signals increase this frequency by 100 cycles per second per decibel. If the 300 cycles per second level is now taken as a 0 db reference, a 0–30 db dynamic range represents a 300 cycle per second to 3,300 cycles per second frequency range with a sensitivity of 100 cycles per second per decibel.

As the counting interval during processing is 10 milliseconds relative to recording time, the end points of this range product counts of 3 and 33 respectively with a change of one unit per db. The counter 50 is so arranged that it subtracts three units from every count made and each total then equals the signal level in db relative to the 0 db reference. This is subject to the usual digital uncertainty, ±0.5 bit, ±½ db. Signals in the 0–30 db range, therefore result in counts of 0–30 increasing one unit per db.

The level counter 50 operates in straight binary code and at the end of the counting interval a comparator 51 compares the total (in 1248 binary) with a pre-set level in 1248 code from a digital selector 52 which is manually set by the operator prior to commencing the plot.

If the signal exceeds the pre-set level, a print pulse is generated by the unit 63 and applied to the plotter "bright up" circuitry, the plotter beam having been concurrently positioned by the spatial address data. The print interval is followed by a re-set command (not shown) to all stages which are thus prepared for the level assessment accompanying the next address.

The above processes continue until all the addresses in the total recording, together with relative signal levels, have been decoded. The Polaroid camera records the position and character (black or white) of each plotted point. At the end of the process, the Polaroid film is virtually immediately available for viewing the facsimile plot, as represented in FIG. 2 at 62. As can clearly be seen from 62, areas of the motor in which greater loss of amplitude occurred than the pre-set appear wholly white or black, as predetermined, in their current locations. Thus known features such as the three vertical stripes, and unknown features such as the blank area, are readily apparent to lay personnel extremely rapidly.

The processing operation is then repeated as may be required to produce further plots at differing pre-set levels by resetting the selector 52, the family of plots representing a series of information filters in which background information is removed and only specific levels displayed.

If a second plotter 54 and camera 55 are available, a second analyser comprising a level counter 57, a comparator 58 and a digital selector 59 is used. This is connected through a channel selector 60 to enable it to deal simultaneously with the reflection test data, or alternatively, it may also deal with the transmission data so that two plots are made simultaneously at different pre-set levels. A further alternative is to utilise the two analysers simultaneously in one plot, with two different pre-set levels, and the output logic of one analyser inverted. In this technique only the information between the two pre-set levels is plotted white, all remaining levels being plotted black or vice versa according to programme. This allows further filtering of information which is useful in some cases of complex section.

An addition to the analysers (not shown in the drawings), consists of a proportional converter whereby level counts are converted to a proportional voltage vector. If the pre-set level is omitted and this vector applied to the plotter brightness circuitry a full grey-scale plot of amplitude results. This resembles a radiograph in character and although sometimes useful qualitatively, it does not provide a quantitative output. By retaining the pre-set level, together with the proportional output, the grey-scale plot may be confined to the data lying only to one side of the pre-set level. This again is useful in certain conditions and assessment is slightly more quantitative that the total grey-scale methods.

With any of the plotting methods described, if any observed feature is required in more detail than that which can be observed in the 3 inches x 1 inch plot, then a further processing run can be made at any preset level with the deflection sensitivities of the plotter increased. A plot can thus be made with the feature occupying the whole of the 4 inches x 5 inches Polaroid print if required. If still further detail is needed, such plots may be made from a further inspection in which the scanning programme covers only the area in question with a much small rotation increment resulting in a larger number of scans over the area. Life size plots of features can be produced in this way.

The equipment is such that alternative methods of applying a pre-set level may be used. The method described achieves the pre-set level by a manual setting which remains constant for each complete facsimile plot. Alternatively, by means of an external programme in which the pre-set level is varied in a manner appropriate to each point address and at which it equals the standard level for the address, then the resulting plot contains only those points which deviate from standard. Such an external programme could be contained in a standard magnetic recording of particular motor type.

We claim:

1. A method of analyzing a property of a test object comprising: systematically scanning the test object with at least one probe beam of ultrasonic sound waves and transmitting said beam through at least a portion of the test object whereby the amplitude of the beam is attenuated and is thereby indicative of the quality at a plurality of locations on the test body of the property being tested; receiving from said locations said attenuated beam; sequentially recording on a storage tape a plurality of qualitative signals each corresponding to the attenuated amplitude of the received beam at a given time; sequentially recording on the tape a plurality of location signals each identifying the location on the test body of a corresponding qualitative signal and each arranged in a predetermined relationship on the tape with the corresponding qualitative signal; sequentially detecting and storing said recorded qualitative and location signals and electronically converting the detected and stored signals to a pictorial representation of at least part of the test object in which the corresponding quality and location signals show the quality of the analyzed property simultaneously for each of a plurality of locations on the test object.

2. A method as in claim 1 wherein the radiation received from each of the plurality of locations on the test object is also reflected from the test object at the location before being so received.

3. A method as in claim 1 wherein the amplitude of the received radiation is converted to a voltage analogue, and after amplification this is operated upon to produce an output which is the voltage analogue of the logarithm of the amplitude of the received radiation, whereby the qualitative signals recorded on the storage tape are in logarithmic relationship to the amplitude of the received radiation.

4. A method according to claim 3 wherein said output is converted to a train of pulses of which the pulse repetition rate is proportional to the voltage of said output.

5. A method according to claim 1 wherein the step of producing said pictorial representation includes the step of deflecting an oscilloscope beam in accordance with each location signal to a position on the screen of the oscilloscope corresponding to the position on the test object of the corresponding location, and controlling the brightness of the beam in accordance with each qualitative signal at the corresponding position.

6. A method according to claim 5 wherein the step of controlling the brightness of the beam includes comparing each qualitative signal to a preset standard signal such that the beam produces a spot of light on the screen only when the qualitative signal has a value either above or below the value of the standard signal.

7. A method according to claim 5 wherein the step of controlling the brightness of the beam includes comparing each qualitative signal to two pre-set standard signals such that the beam produces a spot of light on the screen only when the qualitative signal has a value which is either between or not between the values of the pre-set standard signals.

8. Apparatus for analyzing a property of a test object comprising: a radiation emitter; a radiation receiver for sequentially receiving radiation from the emitter which has been transmitted through at least a portion of the test object at a plurality of locations thereon, the received radiation being indicative of the quality at each location of said property; a storage tape for recording a plurality of qualitative signals corresponding to the radiation received by the receiver; means for recording location signals each identifying a corresponding one of the locations and each arranged in a predetermined relationship on the tape with the qualitative signal related with that location; and analyzing means for producing a pictorial representation of at least part of the test object in accordance with the qualitative and location signals, in which the corresponding quality and location signals show the quality of the analyzed property at each of a plurality of locations on the test object.

9. Apparatus according to claim 8 wherein said receiver produces a voltage analogue output dependent upon the amplitude of the received radiation, and wherein the apparatus further comprises amplifying means and a logarithmic transfer stage such that after amplification the voltage analogue output is operated upon the by the logarithmic transfer stage to produce an output which is the voltage analogue of the logarithm of the input to the logarithmic transfer stage, whereby the qualitative signals recorded on the storage tape are in logarithmic relationship to the amplitude of the received radiation.

10. Apparatus according to claim 9 further comprising a voltage/frequency converter connected to the logarithmic transfer stage to produce a train of pulses of which the pulse repetition rate is proportional to the voltage of the input to the converter, and the pulses constitute the qualitative signals.

11. Apparatus according to claim 8 wherein said analyzing means includes an oscilloscope and an address store memory means at which each location signal is received for controlling the deflection of the oscilloscope beam of the oscilloscope to a position on the screen of the oscilloscope corresponding to the position on the test object itself of the corresponding location, and means responsive to each qualitative signal to control the brightness of the beam at the corresponding position.

References Cited

UNITED STATES PATENTS

| | | |
|---|---|---|
| 2,902,673 | 9/1959 | Hare. |
| 3,036,151 | 5/1962 | Mitchell et al. ____ 73—67.9 XR |

FOREIGN PATENTS

| | | |
|---|---|---|
| 1,210,801 | 3/1960 | France. |
| 887,064 | 1/1962 | Great Britain. |

RICHARD C. QUEISSER, Primary Examiner

J. P. BEAUCHAMP, Assistant Examiner

U.S. Cl. X.R.

73—67.8